(12) United States Patent
Forrest et al.

(10) Patent No.: US 10,989,113 B2
(45) Date of Patent: Apr. 27, 2021

(54) SYSTEM AND METHOD FOR POWER PRODUCTION USING PARTIAL OXIDATION

(71) Applicant: 8 Rivers Capital, LLC, Durham, NC (US)

(72) Inventors: Brock Alan Forrest, Durham, NC (US); Xijia Lu, Durham, NC (US); Rodney John Allam, Wiltshire (GB); Jeremy Eron Fetvedt, Raleigh, NC (US); Miles R. Palmer, Chapel Hill, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 211 days.

(21) Appl. No.: 15/703,042

(22) Filed: Sep. 13, 2017

(65) Prior Publication Data

US 2018/0073430 A1    Mar. 15, 2018

Related U.S. Application Data

(60) Provisional application No. 62/393,752, filed on Sep. 13, 2016.

(51) Int. Cl.
*F02C 3/28* (2006.01)
*F02C 3/24* (2006.01)
(Continued)

(52) U.S. Cl.
CPC ...... *F02C 3/28* (2013.01); *B01J 8/24* (2013.01); *C01B 3/38* (2013.01); *C10J 3/463* (2013.01);
(Continued)

(58) Field of Classification Search
CPC ........... C07C 9/04; C07C 1/02; C07C 1/0485; C07C 1/12; C10J 2300/093; C10J 3/00;
(Continued)

(56) References Cited

U.S. PATENT DOCUMENTS 3,369,361 A    2/1968 Craig
3,376,706 A    4/1968 Angelino
(Continued)

FOREIGN PATENT DOCUMENTS

EP    2 818 240    12/2014
JP    2225905    9/1990
(Continued)

OTHER PUBLICATIONS

Combs, Jr. "An Investigation of the Supercritical CO2 Cycle (Feher Cycle) for Shipboard Application," 1977 *Submitted in Partial Fulfillment of the Requirements for the Degree of Ocean Engineer and the Degree of Master of Science in Mechanical Engineering at the Massachusetts Institute of Technology*, 148.
(Continued)

*Primary Examiner* — Imran Akram
(74) *Attorney, Agent, or Firm* — Womble Bond Dickinson (US) LLP

(57) ABSTRACT

The present disclosure relates to a power production system that is adapted to achieve high efficiency power production using partial oxidation of a solid or liquid fuel to form a partially oxidized stream that comprises a fuel gas. This fuel gas stream can be one or more of quenched, filtered, and cooled before being directed to a combustor of a power production system as the combustion fuel. The partially oxidized stream is combined with a compressed recycle $CO_2$ stream and oxygen. The combustion stream is expanded across a turbine to produce power and passed through a recuperator heat exchanger. The expanded and cooled exhaust stream can be further processed to provide the recycle $CO_2$ stream, which is compressed and passed through one or more recuperator heat exchangers in a manner useful to provide increased efficiency to the combined systems.

25 Claims, 4 Drawing Sheets

(51) Int. Cl.
| | |
|---|---|
| *F02C 3/04* | (2006.01) |
| *F02C 7/22* | (2006.01) |
| *C10J 3/48* | (2006.01) |
| *C10J 3/46* | (2006.01) |
| *C10K 1/00* | (2006.01) |
| *C01B 3/38* | (2006.01) |
| *B01J 8/24* | (2006.01) |
| *C10K 3/02* | (2006.01) |
| *C10K 1/04* | (2006.01) |
| *C10K 1/32* | (2006.01) |
| *C10K 1/10* | (2006.01) |

(52) U.S. Cl.
CPC .............. *C10J 3/466* (2013.01); *C10J 3/485* (2013.01); *C10K 1/002* (2013.01); *C10K 1/003* (2013.01); *C10K 1/004* (2013.01); *C10K 1/005* (2013.01); *C10K 1/007* (2013.01); *C10K 1/04* (2013.01); *C10K 1/10* (2013.01); *C10K 1/32* (2013.01); *C10K 3/026* (2013.01); *F02C 3/04* (2013.01); *F02C 3/24* (2013.01); *F02C 7/22* (2013.01); *B01J 2208/00256* (2013.01); *C01B 2203/0261* (2013.01); *C01B 2203/0465* (2013.01); *C01B 2203/0495* (2013.01); *C01B 2203/0833* (2013.01); *C10J 2300/0959* (2013.01); *C10J 2300/165* (2013.01); *C10J 2300/1606* (2013.01); *C10J 2300/1618* (2013.01); *C10J 2300/1621* (2013.01); *C10J 2300/1653* (2013.01); *C10J 2300/1662* (2013.01); *C10J 2300/1846* (2013.01); *F05D 2220/32* (2013.01); *F05D 2240/35* (2013.01); *Y02E 20/18* (2013.01); *Y02P 20/00* (2015.11)

(58) Field of Classification Search
CPC ........ C10J 2300/0956; C10J 2300/0959; C10J 2300/0969; C10J 2300/0986; C10J 2300/1606; C10J 2300/1618; C10J 2300/165; C10J 230/1662; C10J 2300/1846; C10J 3/482; Y02P 20/52; C01B 3/36; C01B 2203/0261; C10L 3/08; C10K 1/002
See application file for complete search history.

(56) References Cited

U.S. PATENT DOCUMENTS

| | | | |
|---|---|---|---|
| 3,503,208 A | 3/1970 | Schmidt | |
| 3,544,291 A | 12/1970 | Schlinger et al. | |
| 3,723,345 A * | 3/1973 | Reynolds | C01B 32/40 252/373 |
| 3,736,745 A | 6/1973 | Karig | |
| 3,740,204 A * | 6/1973 | Slater et al. | C07C 9/04 48/215 |
| 3,837,788 A | 9/1974 | Craig et al. | |
| 3,868,817 A | 3/1975 | Marion et al. | |
| 3,888,043 A * | 6/1975 | Child | C10K 3/04 48/197 R |
| 3,938,968 A * | 2/1976 | White | C01B 3/36 48/215 |
| 3,954,424 A * | 5/1976 | Goeke | C01B 3/36 48/215 |
| 3,958,956 A * | 5/1976 | Goeke | C01B 3/22 48/62 R |
| 3,971,211 A | 7/1976 | Wethe et al. | |
| 3,976,443 A | 8/1976 | Paull et al. | |
| 4,121,912 A | 10/1978 | Barber et al. | |
| 4,132,065 A | 1/1979 | McGann | |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,461,154 A | 7/1984 | Allam | |
| 4,483,691 A * | 11/1984 | McShea, III | C01B 3/382 48/202 |
| 4,498,289 A | 2/1985 | Osgerby | |
| 4,522,628 A | 6/1985 | Savins | |
| 4,524,050 A * | 6/1985 | Chen | B01J 31/0237 423/242.6 |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,957,515 A | 9/1990 | Hegarty | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,295,350 A | 3/1994 | Child et al. | |
| 5,319,924 A | 6/1994 | Wallace et al. | |
| 5,345,756 A | 9/1994 | Jahnke et al. | |
| 5,353,721 A | 10/1994 | Mansour et al. | |
| 5,394,686 A | 3/1995 | Child et al. | |
| 5,415,673 A | 5/1995 | Hilton et al. | |
| 5,421,166 A | 6/1995 | Allam et al. | |
| 5,507,141 A | 4/1996 | Stigsson | |
| 5,520,894 A | 5/1996 | Heesink et al. | |
| 5,590,519 A | 1/1997 | Almlöf et al. | |
| 5,595,059 A | 1/1997 | Huber et al. | |
| 5,641,327 A * | 6/1997 | Leas | C10J 3/00 48/197 R |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,117,916 A | 9/2000 | Allam et al. | |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Åsen et al. | |
| 6,306,917 B1 | 10/2001 | Bohn et al. | |
| 6,333,015 B1 | 12/2001 | Lewis | |
| 6,360,561 B2 | 3/2002 | Allam et al. | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 | 2/2004 | Frutschi | |
| 6,764,530 B2 | 7/2004 | Lijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |

(56) References Cited

U.S. PATENT DOCUMENTS

| | | | |
|---|---|---|---|
| 6,912,004 B1 | 6/2005 | Knudsen et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,089,743 B2 | 8/2006 | Frutschi et al. | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,281,590 B2 | 10/2007 | Van de Waal | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,363,764 B2 | 4/2008 | Griffin et al. | |
| 7,377,111 B2 | 5/2008 | Agnew | |
| 7,387,197 B2 | 6/2008 | Sprouse et al. | |
| 7,402,188 B2 | 7/2008 | Sprouse | |
| 7,469,544 B2 | 12/2008 | Farhangi | |
| 7,469,781 B2 | 12/2008 | Chataing et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,665,291 B2 | 2/2010 | Anand et al. | |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,739,874 B2 | 6/2010 | Nigro | |
| 7,740,671 B2 | 6/2010 | Yows et al. | |
| 7,740,672 B2 | 6/2010 | Sprouse | |
| 7,814,975 B2 | 10/2010 | Hagen et al. | |
| 7,826,054 B2 | 11/2010 | Zillmer et al. | |
| 7,827,794 B1 | 11/2010 | Pronske et al. | |
| 7,874,140 B2 | 1/2011 | Fan et al. | |
| 7,882,692 B2 | 2/2011 | Pronske et al. | |
| 7,927,574 B2 | 4/2011 | Stewart | |
| 7,934,383 B2 | 5/2011 | Gutierrez et al. | |
| 7,950,243 B2 | 5/2011 | Gurin | |
| 8,043,588 B2 | 10/2011 | Hustad et al. | |
| 8,088,196 B2 | 1/2012 | White et al. | |
| 8,109,095 B2 | 2/2012 | Henriksen et al. | |
| 8,220,248 B2 | 7/2012 | Wijmans et al. | |
| 2002/0121092 A1 | 9/2002 | Allam et al. | |
| 2002/0134085 A1 | 9/2002 | Frutschi | |
| 2003/0131582 A1 | 7/2003 | Anderson et al. | |
| 2004/0011057 A1 | 1/2004 | Huber | |
| 2004/0123601 A1 | 7/2004 | Fan | |
| 2004/0134197 A1 | 7/2004 | Marin et al. | |
| 2005/0126156 A1 | 6/2005 | Anderson et al. | |
| 2006/0242907 A1 | 11/2006 | Sprouse et al. | |
| 2007/0122328 A1 | 5/2007 | Allam et al. | |
| 2007/0130957 A1 | 6/2007 | Hoffmann et al. | |
| 2007/0180768 A1 | 8/2007 | Briesch et al. | |
| 2007/0186474 A1* | 8/2007 | Rabovitser ............ C01B 3/342 48/197 R |
| 2007/0274876 A1 | 11/2007 | Chiu et al. | |
| 2008/0010967 A1 | 1/2008 | Griffin et al. | |
| 2008/0104958 A1 | 5/2008 | Finkenrath et al. | |
| 2008/0115500 A1 | 5/2008 | MacAdam et al. | |
| 2008/0166672 A1 | 7/2008 | Schlote et al. | |
| 2008/0173584 A1 | 7/2008 | White et al. | |
| 2008/0173585 A1 | 7/2008 | White et al. | |
| 2008/0176174 A1 | 7/2008 | White et al. | |
| 2008/0187877 A1 | 8/2008 | Fitzsimmons et al. | |
| 2008/0190214 A1 | 8/2008 | Ubowski et al. | |
| 2008/0226515 A1 | 9/2008 | Allam et al. | |
| 2008/0309087 A1 | 12/2008 | Evulet et al. | |
| 2009/0004096 A1* | 1/2009 | Chow ................ C01B 17/0426 423/574.1 |
| 2009/0025390 A1 | 1/2009 | Christensen et al. | |
| 2009/0061264 A1 | 3/2009 | Agnew | |
| 2009/0130660 A1 | 5/2009 | Faham et al. | |
| 2009/0229271 A1 | 9/2009 | De Ruyck et al. | |
| 2009/0260585 A1 | 10/2009 | Hack et al. | |
| 2009/0301054 A1 | 12/2009 | Simpson et al. | |
| 2009/0324462 A1* | 12/2009 | Robinson ................ C10J 3/00 422/187 |
| 2010/0011664 A1 | 1/2010 | Ariyapadi et al. | |
| 2010/0018218 A1 | 1/2010 | Riley et al. | |
| 2010/0024378 A1 | 2/2010 | Ackermann et al. | |
| 2010/0024381 A1 | 2/2010 | Ackermann et al. | |
| 2010/0024433 A1 | 2/2010 | Ackermann et al. | |
| 2010/0031668 A1 | 2/2010 | Kepplinger | |
| 2010/0077752 A1 | 4/2010 | Papile | |
| 2010/0121125 A1* | 5/2010 | Hippo ................ B01J 35/1014 585/733 |
| 2010/0175320 A1 | 7/2010 | Schuetzle et al. | |
| 2010/0263385 A1 | 10/2010 | Allam | |
| 2010/0324156 A1 | 12/2010 | Winter et al. | |
| 2011/0023539 A1 | 2/2011 | White et al. | |
| 2011/0036011 A1 | 2/2011 | Sprouse et al. | |
| 2011/0127773 A1 | 6/2011 | Freund et al. | |
| 2011/0179799 A1* | 7/2011 | Allam ................ F25J 3/04545 60/772 |
| 2011/0229382 A1 | 9/2011 | Frydman et al. | |
| 2011/0233940 A1 | 9/2011 | Aoyama et al. | |
| 2011/0239651 A1 | 10/2011 | Aoyama et al. | |
| 2011/0271713 A1 | 11/2011 | White et al. | |
| 2012/0131925 A1 | 5/2012 | Mittricker et al. | |
| 2012/0247105 A1 | 10/2012 | Nelson et al. | |
| 2013/0205746 A1 | 8/2013 | Allam et al. | |
| 2014/0369915 A1 | 12/2014 | Yonemura et al. | |
| 2016/0236186 A1* | 8/2016 | Larsen ................ B01J 38/06 |

FOREIGN PATENT DOCUMENTS

| | | |
|---|---|---|
| JP | 2001-132472 | 5/2001 |
| WO | WO 95/12757 | 5/1995 |
| WO | WO 2006/128286 | 12/2006 |

OTHER PUBLICATIONS

Doestal et al., "A Supercritical Carbon Dioxide Cycle Dioxide Cycle for Next Generation Nuclear Reactors," 2004, (*Research Paper*) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

E.I. Yantovskii et al., "Computer Exergonomics of Power Plants Without Exhaust Gases," Energy Conyers. Mgmt., Publ. 1992, vol. 33, No. 5-8, pp. 405-412.

Mathieu et al., "Sensitivity Analysis of the MATIANT Cycle", *Energy Conversion & Management*, 1999, pp. 1687-1700, vol. 40.

Wall et al., "A Zero Emission Combustion Power Plant for Enhanced Oil Recovery," *Energy*, 1995, pp. 823-828, vol. 20, No. 8.

http://www.graz-cycle.tugraz.at/pdfs/Bolland_Kvarnsdal_Boden_ Liege.pdf; Boland, "A Thermodynamic Comparison fo the Oxy-Fuel Power Cycles Water-Cycle, Graz-Cycle and Matiant-Cycle," *Norwegian University of Science and Technology*, Trondheim, Norway. Presentation, paper published in the proceedings of the International Conference Power Generation and Sustainable Development, Liège (Belgium), Oct. 8-9, 2001.

(56) References Cited

OTHER PUBLICATIONS http://www2.ulg.ac.be/genienuc/pageco2.htm; Université de Liège, Department of Power Generation, "CO2 Researches". Web-page dated Sep. 1, 1998 (retrieved on Feb. 25, 2011).

* cited by examiner

SYSTEM AND METHOD FOR POWER PRODUCTION USING PARTIAL OXIDATION

CROSS-REFERENCE TO RELATED APPLICATIONS

The present application claims priority to U.S. Provisional Patent Application No. 62/393,752, filed Sep. 13, 2016, the disclosure of which is incorporated herein by reference.

FIELD OF THE DISCLOSURE

The present invention is directed to systems and methods for generation of power, such as electricity, that utilize partial oxidation in the combustion of a fuel.

BACKGROUND

Conventional means of power production from combustion of a fuel typically lack the ability to simultaneously achieve both high efficiency power generation and carbon capture. This limitation is magnified when using solid fuels in the combustion reaction because of the solid and inert nitrogen gas contents remaining in the combustion product stream. Accordingly, there is an ever growing need in the art for systems and methods for high efficiency power generation allowing for a reduction in $CO_2$ emission and/or improved ease of sequestration of produced carbon dioxide.

One publication in the field of high efficiency power generation with carbon capture, U.S. Pat. No. 8,596,075 to Allam et al., provides one solution whereby a solid fuel such as coal, lignite, pet-coke or biomass is gasified by reaction with oxygen and optionally steam in a partial oxidation reactor operating at a sufficiently high pressure and temperature to allow substantially complete conversion of the solid fuel to a gaseous fuel comprising mainly carbon monoxide and hydrogen as the combustible components together with combustion derived impurities, such as $H_2S$, $CS_2$, carbonyl sulfide (COS), HCN, and $NH_3$. The partially oxidized net product gas is cooled, ash is separated, and it is optionally compressed to allow it to be introduced as fuel into the combustion chamber of the power generation system. The operating pressure of the partial oxidation system and the power generation system can be such that no compression of the fuel gas is required. The power generation system combustor operates with an excess of $O_2$ present following combustion, which ensures that the fuel and combustion derived impurities are converted from the reduced to their oxidized forms comprising predominantly $SO_2$ and NO. The partial oxidation reactor can be provided with transpirationally cooled walls with a high pressure recycle $CO_2$ stream cooling the partial oxidation product gas before ash removal at a temperature level of about 800° C. Further cooling of the partial oxidation gas to about 400° C. is necessary to ensure that all fine ash particles together with solidified volatile inorganic components are condensed and filtered to prevent solid deposition, corrosion, and blockage of down-stream equipment. The cooling of the partial oxidation gas from 800° C. to 400° C. must take place in a heat exchanger with tubes for the high pressure partial oxidation gas that are resistant to metal dusting corrosion due to the Boudouard carbon forming reaction and the high CO partial pressure in the partial oxidation gas. This is shown below in Formula (1).

$$CO+CO=C+CO_2 \tag{1}$$

The tubes must be designed to allow periodic water washing to remove solid deposits derived from the condensation of volatile inorganic components present in solid fuels, particularly coal and lignite.

Despite the advances of the above-described publication, the systems and methods described therein still do not provide a most advantageous solution to the problems arising when using solid fuels as a power production combustion fuel. Thus, there remains a need for further systems and methods for high efficiency combustion of solid fuels with carbon capture.

BRIEF SUMMARY OF THE DISCLOSURE

The present disclosure provides systems and methods for high efficiency power production with combustion of fuels while achieving simultaneous carbon capture. In particular, the disclosed systems and methods can utilize a partial oxidation (POX) reactor wherein the fuel is combusted to produce a POX stream comprising partial oxidation products. The POX stream can be directed to a combustor wherein the at least some of the partial oxidation products are substantially completely oxidized to produce a combustion product stream.

Systems and methods for power production utilizing partial oxidation are disclosed, for example, in U.S. Pat. No. 8,776,532, to Allam et al., and the disclosure thereof is incorporated herein by reference in its entirety. The present disclosure provides further systems and methods that may incorporate one or more elements from Allam et al. but that provide further advantages for high efficiency power production incorporating partial oxidation of a fuel followed by combustion of at least a portion of the partial oxidation products.

In one or more embodiments, the present disclosure can relate to a process for the production of power using a combination of a partial oxidation (POX) system and a power production system (PPS). In a non-limiting example, such process can comprise at least the following steps:

combining a solid or liquid fuel and oxygen in a POX reactor under conditions sufficient to partially oxidize the fuel and form a POX stream comprising a fuel gas at a first temperature;

removing from the POX stream comprising the fuel gas at least a portion of any solid components or gaseous components that do not form part of the fuel gas;

cooling the POX stream comprising the fuel gas in a POX heat exchanger to a second, lower temperature;

purifying the POX stream comprising the fuel gas by removing at least a portion of any liquid water and acid gases therefrom and thus forming a stream of the fuel gas;

compressing the stream of the fuel gas to a pressure of about 12 MPa or greater;

combusting the stream of the fuel gas in a PPS combustor to form a combustion product stream at a pressure of at least about 10 MPa and a temperature of at least about 800° C.;

expanding the combustion product stream across a PPS turbine to generate power and form an expanded PPS combustion product stream;

passing the expanded PPS combustion product stream through a PPS recuperator heat exchanger and thereby withdrawing heat from the PPS combustion product stream and forming a cooled PPS combustion product stream;

removing at least a portion of one or more impurities from the cooled PPS combustion product stream to form a recycle $CO_2$ stream; and pressurizing the recycle $CO_2$ stream in a PPS compressor to form a compressed recycle $CO_2$ stream.

In further embodiments, a process as described above may be further defined in relation to any one or more of the following statements, which may be combined in any number or order.

The POX reactor can be a gasifier.

The POX reactor can be a fluidized bed reactor.

The POX reactor can be a catalyzed reactor.

The process can comprise reducing the temperature of the POX stream comprising the fuel gas to a temperature that is less than the first temperature and greater than the second temperature prior to cooling the POX stream comprising the fuel gas in the POX heat exchanger.

The step of reducing the temperature of the POX stream comprising the fuel gas can comprise adding a quenching fluid to the POX reactor.

The quenching fluid can comprise one or both of water and $CO_2$.

The process further can comprise heating the stream of the fuel gas after said compressing and before said combusting.

The step of heating the stream of the fuel gas can comprise passing the stream of the fuel gas through the PPS recuperator heat exchanger.

The process can further comprise processing a portion of the POX stream comprising the fuel gas in a carbonyl sulfide (COS) hydrolysis reactor adapted to convert COS to $H_2S$.

The process can further comprise providing one or both of steam and $CO_2$ into the POX reactor.

The POX heat exchanger can be configured to withdraw heat from the POX stream comprising the fuel gas against one or more of the following: a portion of the compressed recycle $CO_2$ stream; a stream of pressurized water; a nitrogen stream; a stream of pressurized $O_2$ and $CO_2$; a stream of the fuel gas.

The process can further comprise passing a portion of the POX stream comprising the fuel gas through a shift reactor configured to convert a mixture of $H_2$ and $CO_2$ to a mixture of CO and $H_2O$ or configured to convert a mixture of CO and $H_2O$ to a mixture of $H_2$ and $CO_2$.

The process can further comprise mixing a portion of the POX stream comprising the fuel gas with a portion of the recycle $CO_2$ stream to form a mixture, and processing the mixture in the shift reactor.

The shift reactor can be a reverse water gas shift (WGS) reactor.

The process can further comprise passing a portion of the POX stream comprising the fuel gas through a warm desulfurization unit configured to remove one or more of $H_2S$, COS, and heavy metals from the POX stream comprising the fuel gas stream.

The process can further comprise passing at least a portion of the POX stream comprising the fuel gas through an activated adsorption system configured to remove mercury from the POX stream comprising the fuel gas.

The process can further comprise passing at least a portion of the stream of the fuel gas through an acid gas removal unit configured to separate one or both of at least a portion of any $H_2S$ and at least a portion of any $CO_2$ present in the stream of the fuel gas.

The process can further comprise passing at least a portion of the stream of the fuel gas through a catalytic methanation system configured to convert CO and $H_2$ to $CH_4$ and $H_2O$.

At least a portion of the compressed recycle $CO_2$ stream can be heated in the PPS recuperator heat exchanger and passed to the PPS combustor.

A portion of the compressed recycle $CO_2$ stream can be passed to the POX heat exchanger.

The compressed recycle $CO_2$ stream can exit the POX heat exchanger and be passed to the PPS recuperator heat exchanger.

A portion of the compressed recycle $CO_2$ stream can be passed to the POX reactor.

A portion of the compressed recycle $CO_2$ stream can be combined with the solid or liquid fuel prior to combining the solid or liquid fuel with the oxygen in the POX reactor.

The solid or liquid fuel can comprise a fuel slurry formed of a solid fuel combined with a liquid or supercritical $CO_2$.

In one or more embodiments, the present disclosure further can relate to a system configured for power production. The system particularly comprises a combination of a partial oxidation (POX) system and power production system (PPS). The combined system can comprise a combination of a number of components. Minimally, the combined system can comprise:

a catalytic or non-catalytic POX reactor adapted to partially oxidize a liquid or solid fuel in the presence of oxygen (and optionally steam, $CO_2$, and/or a catalyst) to form a POX stream comprising a fuel gas;

one or more components adapted to contact the POX stream with a quenching fluid;

a POX heat exchanger adapted to withdraw heat from the POX stream against one or more of a portion of a compressed recycle $CO_2$ stream, a high pressure water stream, a nitrogen stream withdrawn from an ASU, a high pressure $O_2/CO_2$ stream, and a cleaned and cooled fuel gas, and output a cooled POX stream from the POX heat exchanger;

a compressor adapted to compress the cooled POX stream (or fuel gas from the POX stream) to a pressure of about 10 MPa or greater;

a PPS combustor adapted to combust the fuel gas from the POX stream in the presence of oxygen and a portion of the compressed recycle $CO_2$ stream and form a PPS combustion product stream at a pressure of about 10 MPa or greater;

a turbine adapted to expand the PPS combustion product stream and generate power in a connected generator;

a recuperator heat exchanger adapted to withdraw heat from the expanded PPS combustion product stream and add the heat to the compressed recycle $CO_2$ stream;

a PPS compressor adapted to compress the recycle $CO_2$ stream to a pressure of about 10 MPa or greater and form the compressed recycle $CO_2$ stream; and flow components (e.g., flow lines) adapted to transfer one or more streams to one or more different components of the combined system.

In certain embodiments, the combined system can comprise one or more further components. For example, the present disclosure is intended to encompass a combined system include the above-listed components and one or more of the following components that may be combined in any order and in any number. As such, the combined system may comprise any one, two, three, or more of:

a high temperature heat exchanger, such as a radiant cooler or a convective cooler, configured to recuperate high grade heat a partially quenched POX stream (e.g., the POX stream being at a temperature of about 900° C. or less);

a POX scrubber adapted to separate at least a portion of solids and/or soluble acid gases that are present in the quenched POX stream;

a filtration device adapted to separate solidified ash particles from a single phase quenched POX stream;

a catalytic shift reactor adapted to either convert a mixture of $H_2$ and $CO_2$ to a mixture of CO and $H_2O$ or convert a mixture of CO and $H_2O$ to a mixture of $H_2$ and $CO_2$;

a COS hydrolysis reactor adapted to convert COS to $H_2S$;

a warm desulfurization unit adapted to remove $H_2S$, COS, and heavy metals from the POX stream by using a regenerable solid sorbent;

a separator adapted to separate any liquid water from the POX stream;

an activated adsorption system adapted to remove mercury from the POX stream;

a pre-combustion acid gas removal unit adapted to separate at least a portion of any $H_2S$ and/or $CO_2$ present in the POX stream;

a catalytic methanation system adapted to convert CO and $H_2$ in the POX stream (or in a stream of fuel gas from the POX stream) to $CH_4$ and $H_2O$;

a PPS scrubbing tower adapted to separate one or more of $H_2SO_4$, $HNO_3$, and water-dissolved Hg salts from the expanded PPS combustion product stream and output a recycle $CO_2$ stream;

flow components adapted to direct a portion of the compressed recycle $CO_2$ stream to the POX heat exchanger;

flow components adapted to direct a portion of the compressed recycle $CO_2$ stream to the PPS recuperator heat exchanger;

flow components adapted to direct the compressed recycle $CO_2$ stream from the POX heat exchanger to the PPS recuperator heat exchanger;

flow components adapted to direct a portion of the compressed recycle $CO_2$ stream to the POX reactor, such as for controlling the POX reactor operating temperature; and flow components adapted to direct a portion of the compressed recycle $CO_2$ stream to the solid fuel feeding system to drive the pulverized solid fuel into the POX reactor.

In one or more embodiments, the present disclosure particularly can relate to a power production unit comprising a partial oxidation (POX) system and a power production system (PPS), wherein the power production unit comprises:

a POX reactor;

a POX scrubber unit including an inlet in fluid communication with an outlet of the POX reactor;

a POX heat exchanger including an inlet in fluid communication with an outlet of the scrubber unit;

a POX water separator including an inlet in fluid communication with an outlet of the POX heat exchanger;

a POX acid gas removal system including an inlet in fluid communication with an outlet of the water separator;

a POX compressor including an inlet in fluid communication with an outlet of the acid gas removal system;

a PPS combustor including an inlet in fluid communication with an outlet of the POX compressor and configured to receive a fuel gas therefrom;

a PPS turbine including an inlet in fluid communication with an outlet of the PPS combustor and configured to receive a combustion product stream therefrom;

a PPS recuperator heat exchanger including an inlet in fluid communication with an outlet of the PPS turbine;

a PPS separator including an inlet in fluid communication with an outlet of the PPS recuperator heat exchanger; and a PPS compressor including an inlet in fluid communication with an outlet of the PPS separator.

In further embodiments, the power production unit can be characterized in relation to one or more of the following statements, which can be combined in any number or order.

The power production unit can further comprise one or more of: a solid fuel feeding system; a shift reactor; a carbonyl sulfide (COS) hydrolysis reactor; a desulfurization unit; an activated adsorption unit; and a catalytic methanation system.

The power production unit can further comprise a closed heat transfer loop between the POX heat exchanger and the PPS recuperator heat exchanger.

The power production unit can encompass one or more of the following conditions: the POX water separator includes an outlet in fluid communication with an inlet of the POX reactor; the PPS compressor includes an outlet in fluid communication with an inlet of the POX heat exchanger; the PPS compressor includes an outlet in fluid communication with an inlet of the PPS recuperator heat exchanger.

The power production unit can further comprise one or more of the following: one or more flow lines for fluid communication between the PPS compressor and the POX heat exchanger; one or more flow lines for fluid communication between the PPS compressor and the PPS recuperator heat exchanger; one or more flow lines for fluid communication between the PPS compressor and the POX reactor.

In one or more embodiments, a different fuel can be utilized for startup of a power production unit. For example, a gaseous fuel stream may be used in one or both of the POX reactor and the PPS combustor until the POX system and/or the PPS is running in a steady state.

BRIEF DESCRIPTION OF THE DRAWINGS

Figure 1:
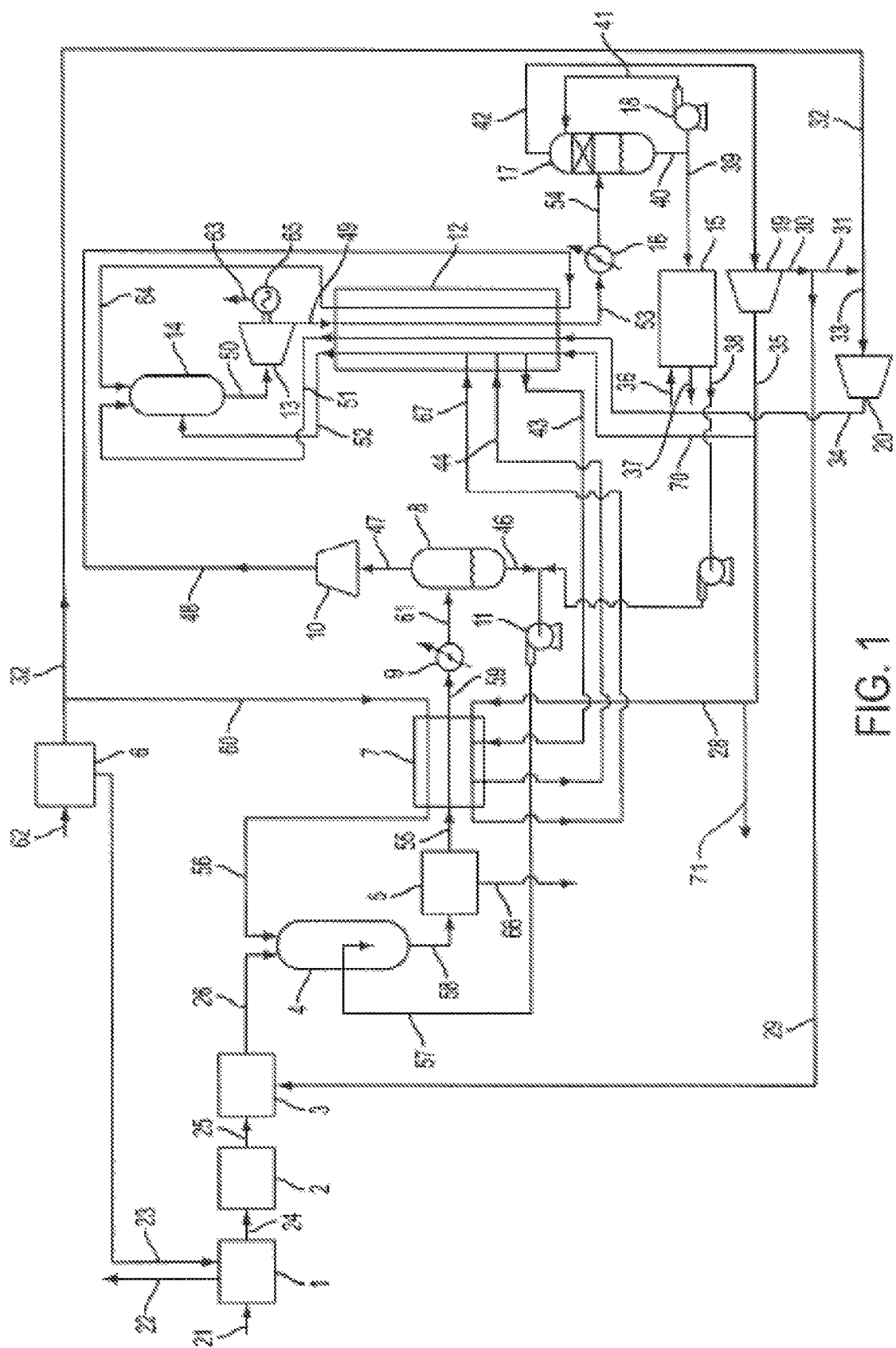
Figure 2:
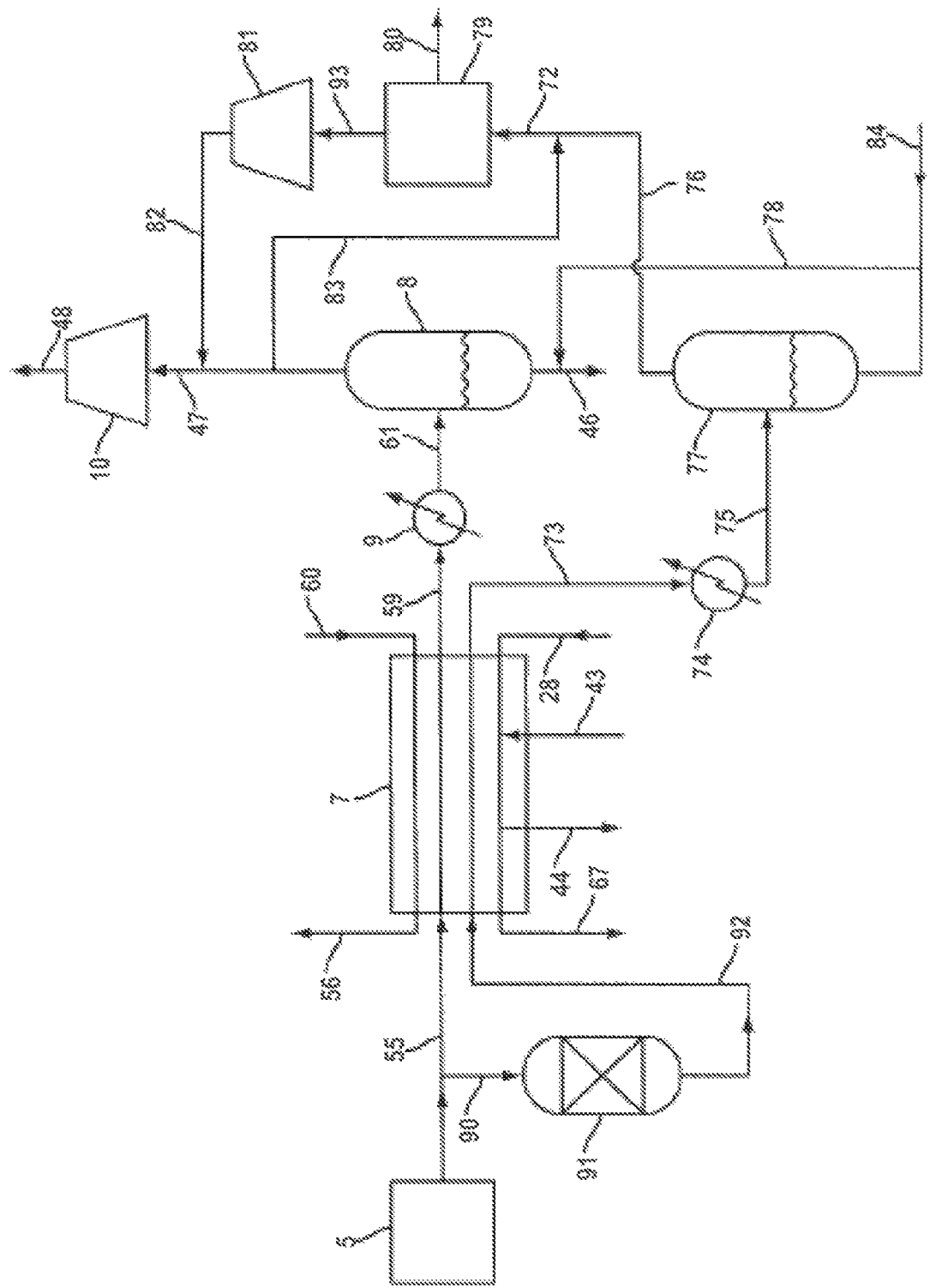
Figure 3:
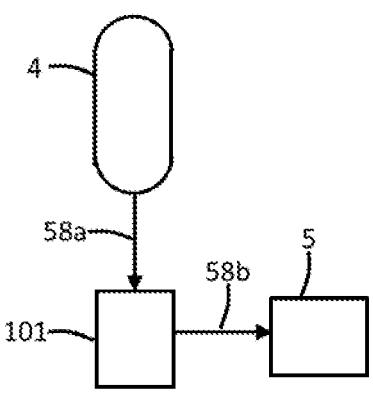
Figure 4:
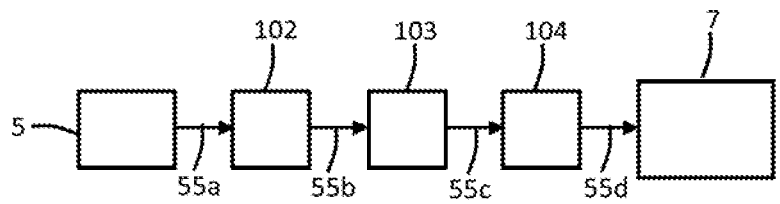
Figure 5:
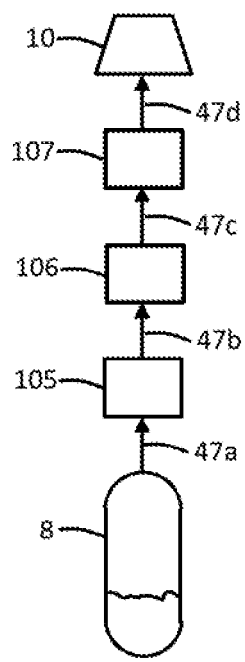
Figure 6:
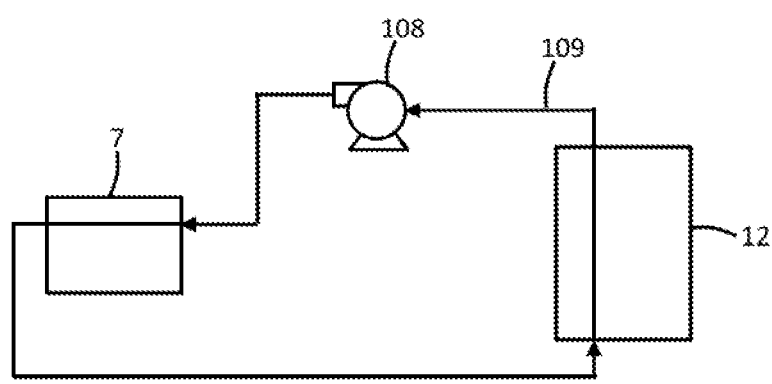

Having thus described the invention in general terms, reference will now be made to the accompanying drawings, which is not necessarily drawn to scale, and wherein:

FIG. 1 is flow diagram illustrating an example embodiment of a combined POX system and PPS according to the present disclosure wherein the PPS generates power using a fuel gas derived from the partial oxidation of a liquid or solid hydrocarbon or carbonaceous fuel in the POX system;

FIG. 2 is a flow diagram illustrating a portion of the combined system from FIG. 1, wherein the illustrated portion particularly shows elements of the combined system useful for production of export $H_2$ or $H_2$+CO mixtures;

FIG. 3 is a flow diagram illustrating placement of a cooling device according to embodiments of the present disclosure;

FIG. 4 is a flow diagram illustrating placement of a shift reactor, a COS hydrolysis reactor, and a desulfurization unit according to embodiments of the present disclosure;

FIG. 5 is a flow diagram illustrating placement of an acid gas removal system, an activated absorption system, and a catalytic methanation system according to embodiments of the present disclosure; and FIG. 6 is a flow diagram illustrating a closed heat transfer loop configured for transfer of heat between a POX heat exchanger and a PPS recuperator heat exchanger according to embodiments of the present disclosure.

DETAILED DESCRIPTION OF THE DISCLOSURE

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The systems and methods of the present disclosure are adapted for achieving partial oxidation (POX) of a carbonaceous fuel, particularly a solid fuel and/or a liquid fuel. Non-limiting examples of fuels that can be used according to the present disclosure include coal, lignite, petroleum coke, bitumen, biomass, algae, wood, graded combustible solid waste refuse, asphalt, used tires, crude oil, other ash containing liquid fuels, and the like. The fuel can be provided to a POX reactor as a powdered solid, as a highly viscous fluid, and as a briquetted solid.

Partial oxidation of the carbonaceous fuel in the POX reactor forms a POX stream, which can be defined in terms of the components thereof. In particular, the POX stream can comprise a fuel gas and optionally one or more impurities (oxidizable impurities and non-oxidizable). The fuel gas taken from the stream exiting the POX reactor can be input to a combustor in a power production system. For example, a combustor and associated power production cycle that can be combined with the systems and methods of the present disclosure is described in U.S. Pat. No. 8,596,075 to Allam et al., the disclosure of which is incorporated herein by reference. Such combustor and associated power production cycle may be referenced herein as the "Allam Cycle." The process of the Allam Cycle achieves power generation using predominantly $CO_2$ as a working fluid. In particular, the process uses a turbine that expands a mixture of a high pressure recycle $CO_2$ stream and combustion products arising from combustion of the fuel. Pure oxygen can be used as the oxidant in the combustion process. The hot turbine exhaust is used to partially preheat the high pressure recycle $CO_2$ stream. The recycle $CO_2$ stream of the Allam Cycle is also heated using added heat that is not derived from the hot turbine exhaust. For example, compression energy of the air feed of an $O_2$ production plant may be used. All fuel and combustion derived impurities such as sulfur compounds, NO, $NO_2$, $CO_2$, $H_2O$, Hg and the like can be separated for disposal with no emissions to the atmosphere.

The systems and methods of the present disclosure specifically can be characterized as being a combination of a POX system and power production system (PPS). The Allam Cycle is an example of a PPS that can be used according to the present disclosure. In particular, a fuel gas from the POX stream can be introduced to the PPS combustor as part or all of the fuel stream for the combustor. In a high pressure combustion cycle, the fuel gas from the POX stream must in general be compressed to the high pressure required in the power production system combustor. For example, the fuel gas from the POX stream may be compressed in a compressor to a pressure of at about 10 MPa or greater, about 15 MPa or greater, about 20 MPa or greater, or about 25 MPa or greater. In other embodiments, the pressure can be about 8 MPa to about 50 MPa, about 15 MPa to about 45 MPa, or about 20 MPa to about 40 MPa.

The combination of a POX system and a PPS system is described in U.S. Pat. No. 8,776,532 to Allam et al., the disclosure of which is incorporated herein by reference. The systems and methods of the present disclosure can incorporate a variety of aspects of the systems and methods described therein.

The reaction of oxygen with a solid or liquid fuel can provide a POX stream comprising a fuel gas, and said stream can comprise varying amounts of solids and molten solids based upon the type of POX reactor that is utilized, and such solids may be removed before introduction of the fuel gas into the PPS combustor. Specifically, the POX stream comprising the fuel gas can be cooled as necessary to a temperature wherein ash and other solid materials can be removed. In some embodiments, however, solids may be removed prior to cooling. Such removal can be beneficial to prevent downstream contamination of equipment in the POX system and the PPS. The heat liberated during cooling of the POX stream can be transferred to the power production system to maximize overall efficiency of the power production system. In particular, this heat can be used for partially heating at least a portion of the recycle $CO_2$ fluid circulating in the power production after cooling of the combustion product stream and prior to input of the recycle $CO_2$ fluid back into the combustor of the power production system. In particular, the heat can be added to the recycle $CO_2$ fluid following the compression of the recycle $CO_2$ fluid. Optionally the oxygen required for the POX reactor and/or the power production system combustor can also be heated against the cooling POX stream in the same or a different heat exchanger.

The POX reactor utilized according to the present disclosure can include any reactor that is known to be useful in the formation of partial combustion gases. For example, gasifiers useful in the formation of syngas may be used. Likewise, fluidized bed reactors may be used. Further, the reactor may be a catalyzed reactor or may be a non-catalyzed reactor. The POX stream exiting the POX reactor can comprise a fuel gas as further described herein. It is understood that the use herein of the term "POX stream" refers to the stream exiting the POX reactor that includes a fuel gas and optionally one or more contaminants or non-fuel gas materials. The fuel gas from the POX stream can be isolated therefrom, such as through removal of the contaminants—e.g., solids, sulfur, metals, water, acid gases, and the like. The POX stream thus may be sufficiently processed (e.g., purified and/or converted) so as to provide a resulting fuel gas that can be substantially pure—i.e., can comprise substantially only components that are fuel gases that are combustible in the PPS combustor as described herein. If desired, however, the fuel gas stream may be configured to include a content of combustible solids and/or combustible liquids, which can be combusted in the PPS combustor.

The POX reactor can be adapted to provide an output POX stream having a first temperature, and the POX stream can be cooled to a second, lower stream. Depending upon the POX reactor used, the POX stream comprising a fuel gas exiting the POX reactor can be at a temperature of about 1200° C. or greater, about 1300° C. or greater, or about 1400° C. or greater. More particularly, the temperature can be about 1000° C. to about 2000° C., about 1200° C. to about 1800° C., or about 1300° C. to about 1600° C. In other embodiments, the POX reactor can be configured for operation at a significantly lower temperature. In such embodiments, the POX stream comprising a fuel gas exiting the POX reactor can be at a temperature of about 300° C. or greater, about 400° C. or greater, or about 500° C. or greater. More particularly, the temperature can be about 300° C. to about 1000° C., about 350° C. to about 900° C., or about 400° C. to about 800° C. In various embodiments, one or more steps can be utilized to cool the POX stream (and thus the fuel gas for input to a further combustor), preferably to about ambient temperature.

In one or more embodiments, the POX stream immediately exiting the POX reactor at a temperature as described above can be cooled to a lesser temperature. Cooling can comprise the use of one or more heat exchangers. Alternatively or additionally, the POX stream comprising the fuel gas can be quenched by introduction of a quenching fluid into the POX reactor. Quenching and/or cooling can be carried out before separation of solids from the POX stream, after separation of solids from the POX stream, or both. Preferably, quenching and/or cooling reduces the temperature of the POX fuel gas stream by about 100° C. or more, about 200° C. or more, about 300° C., about 400° C. or more, or about 500° C. or more. In some embodiments, quenching can be considered cooling the POX stream to the second, lower temperature. As further described herein, however, quenching can be considered an intermediate cooling step, and the POX stream is later cooled to the second, lower temperature.

Quenching can be carried out by mixing of the POX stream with one or more quenching fluids. Non-limiting examples of quenching fluids that can be used according to the present disclosure include a stream of recycled POX stream (i.e., fuel gas or the POX stream including fuel gas and one or more impurities), water at a quenching fluid temperature, liquid $CO_2$, mixtures thereof, and the like. In some embodiments, for example, a dry feed gasifier may be used with $CO_2$ provided as a feed gas or a lock hopper. In further examples, other substantially inert gases, such as $N_2$, may be used. A useful quenching fluid temperature can be about 150° C. or less, about 100° C. or less, about 75° C. or less, or about 60° C. or less. The quenching fluid temperature particularly can be about 10° C. to about 150° C., about 15° C. to about 100° C., or about 20° C. to about 75° C. In embodiments using a water quench, a portion of the water can be vaporized thus giving a mixture of fuel gas, steam, and a liquid water portion, which washes out the bulk of the ash particles. The temperature of the total liquid and vapor will be determined by the pressure used in the POX reactor and the quantity of liquid water used for the quench.

The POX stream exiting the POX combustor can be processed for removing at least a portion of any solid components or gaseous components that do not form part of the fuel gas. Such processing can comprise a variety of purifying steps and/or conversion steps.

In some embodiments, a POX stream exiting the POX reactor (that is non-quenched or has been quenched or otherwise cooled) can be processed in a COS hydrolysis reactor. This can be useful to convert COS to $H_2S$. Further, the POX stream can be processed in a warm desulfurization unit. This can be useful to remove $H_2S$, COS, and heavy metals from the POX stream using, for example, a regenerable solid sorbent, such as zinc oxide. COS hydrolysis and desulfurization can be carried out sequentially (in any order), or only one of the processes may be carried out.

In one or more embodiments, the present system and method can be configured for separation of any liquid water and the bulk of any ash particles or further solids from the cooled POX stream vapor. Removal of the solids can be carried out using any conventional separation or filter means. Non-limiting examples of suitable solids removal components include cyclone filters, settling tanks, candle filters, bag filters, liquid wash towers, and the like. Such components may be configured for removal of solids and/or soluble gases. For example, a water scrubber can be utilized.

Cooling of the POX stream can comprise a plurality of stages. The stream may be first cooled, have solids separated therefrom and then be further cooled, such as to near ambient temperature, using one or more heat exchangers. In particular, a POX heat exchanger can be adapted to transfer the heat from the POX stream (which has optionally already been quenched and/or otherwise cooled to a temperature below the POX reactor temperature) to one or more portions of the high pressure $CO_2$ recycle stream utilized in the power production system. For example, the heat can be transferred to the high pressure $CO_2$ recycle stream taken from the $CO_2$ recycle compressor discharge and/or to one or more appropriate points in the recuperator heat exchanger that is used in the power production cycle. The choice of temperatures for the injection of heat to the PPS recuperator heat exchanger and the number and inlet temperature of the streams taken from the PPS recuperator heat exchanger to be heated in the quenched fuel gas cooler can be determined by altering the heat recovery process to ensure heat recovery is at the maximum temperature level consistent with economic heat exchanger sizes.

In some embodiments, a process according to the present disclosure can comprise partially oxidizing the solid or liquid fuel in the POX reactor to form the POX stream comprising the fuel gas at a first temperature. The POX stream can be optionally quenched to a lower temperature within the POX reactor, within a separate section of the POX reactor, or within a separate quench vessel. The POX stream comprising the fuel gas can be processed for removal of at least a portion of any solid components or gaseous components that do not form part of the fuel gas. For example, the POX stream can be processed through a scrubber. Thereafter, the POX stream can optionally be process through one or more of a shift reactor, a COS hydrolysis reactor, and a warm desulfurization unit. The POX stream can then be cooled in the POX heat exchanger to a second, lower temperature. The cooled POX stream can then be purified by removal of any water therefrom and removal of any acid gases therefrom. At this point, the substantially purified stream can be considered a fuel gas stream derived from the POX stream. It is understood, however, that the stream may likewise be referred to as a POX stream comprising fuel gas wherein the fuel gas comprises a majority (by mol %) of the stream. The fuel gas stream can optionally be processed through one or both of an activated absorption system and a catalytic methanation system. Thereafter, the fuel gas can be compressed to a pressure suitable for input to the PPS combustor.

The fuel used in the POX reactor can be provided in a variety of forms. In embodiments noted above, a solid fuel can be provided in a particulate form, preferably a finely powdered state and can be slurried with a slurry medium. In some embodiments, the slurry medium can comprise, for example, water, liquid $CO_2$, and combinations thereof. Liquid $CO_2$ can be formed, at least in part, from recycled $CO_2$ from the power production system. The carbonaceous fuel used in the POX reactor can be a liquid such as heated bitumen, in which case no slurrying fluid may be needed. In some embodiments, powdered solid fuel can be mixed with $CO_2$ (and/or $N_2$) and fed into the POX reactor, for example a dry fed gasifier where $CO_2$ is used as a feed gas for a lock hopper.

Heat liberated by cooling the quenched POX stream in the heat exchanger following ash removal can be transferred to one or more portions of the high pressure $CO_2$ recycle stream taken from the power production system. The quench fluid can be recycled POX stream leaving the cool end of the POX heat exchanger following liquid water separation, or it can be condensed and separated water. It also can be a combination of fuel gas and water. Still further, it can be recycled $CO_2$, or a combination of fuel gas, or water, or both with $CO_2$. In other embodiments, a nitrogen stream (e.g., drawn from an air separation unit) may be used as the quench fluid. Further, a high pressure stream of $O_2$ and $CO_2$ may be used.

In some embodiments, the source of the quench fluid can be particularly relevant. Embodiments utilizing a $CO_2$ slurrying medium can result in a net production of water derived from hydrogen and water present in the solid fuel feed (e.g., coal). Separated liquid water thus can be treated to separate flammable components dissolved in the water. These separated flammables can be compressed and returned to the power production system combustor. The cleaned water stream then can be recycled to either the solid fuel slurrying system or the POX quench system, and any surplus water can be sent to the power production system where it can be used to dilute any $H_2SO_4/HNO_3$ acid produced at the water separation stage in the power production system as described in U.S. Pat. No. 8,596,075 to Allam et al. In embodiments wherein the solid fuel is slurried with water, the water present in the high temperature POX stream can react with the CO produced by partial oxidation of the carbon in the solid fuel to produce hydrogen gas and carbon monoxide. These can be present in a ratio of approximately 1:1 $H_2$ and CO by volume.

This consumption of water in the shift reaction can be indicative of a water deficiency, and water produced in the power production system then can be returned to the POX system to produce the solid fuel coal slurry and thus make up for this consumption. The net, cooled POX stream (i.e., the fuel gas stream) then can be compressed to the required pressure for combustion in the power production combustor. In various embodiments, the system and method of the present disclosure can be adapted for production of an internal quench fluid for use with the high temperature POX stream exiting the POX reactor. This can arise from the sequential steps of POX reaction, solids removal, heat exchange cooling, and water separation. The net quantity of fuel gas from the POX stream can be compressed and delivered to the power production system combustor with a relatively high concentration of flammable gases (e.g., $H_2$ and CO) and with a calorific value which will ensure useful combustion conditions in the power production system combustor.

In one or more embodiments, a reverse water gas shift (WGS) reactor may be utilized. For example, in some embodiments a portion of a recycle $CO_2$ stream from the PPS can be combined with at least a portion of the POX stream (or fuel gas from the POX stream), and the combination can be directed to the reverse WGS reactor. This can be useful for converting $CO_2$ and $H_2$ to CO and $H_2O$.

In some embodiments, a POX reactor according to the disclosure can be adapted to operate at a pressure that is higher than the pressure in the power production system combustor. The power production system combustor particularly can use $CO_2$ as the working fluid that is continuously recycled in the system. Preferably, the POX stream can be quenched and cooled via heat exchange as described herein using either cooled POX stream or water as the quench medium, and the cooled POX stream (i.e., a fuel gas) can be used in the power production system without the need for further compression. The POX reactor can comprise any reactor adapted for combustion of a carbonaceous fuel, particularly wherein the fuel is only partially oxidized, and particularly wherein the reactor is adapted to function at a pressure that is greater than the operating pressure of a power production system combustor as described herein. In exemplary, non-limiting embodiments, a POX combustor can utilize transpiration cooling wherein a cooling fluid, such as $CO_2$, is passed through a porous transpiration layer surrounding the POX combustion chamber, which can be particularly useful to prevent ash impingement and agglomeration. Exemplary embodiments of transpiration cooling that can be used with a POX reactor according to the present disclosure are described in U.S. Patent Application Publication No. 2010/0300063 to Palmer et al., U.S. Patent Application Publication No. 2011/0083435 to Palmer et al. and U.S. Patent Application Publication No. 2012/0073261 to Palmer et al., the disclosures of which are incorporated herein by reference. The POX combustor particularly can be adapted for receiving a fuel stream and an oxygen source for combustion of the fuel stream. Optionally, a catalyst may be included in the POX reactor and/or a catalyst may be introduced to the POX reactor, such as in admixture with the fuel. Optionally, a steam stream may be introduced to the POX reactor.

In further embodiments, a POX reactor according to the disclosure can be adapted to operate at a pressure that is below the pressure of the power production system combustor. In such embodiments, a fuel gas stream derived from the POX stream for use in the power production system combustor can be compressed before passage into the power production system combustor. If desired, the fuel gas stream can be pre-heated, such as via passage through one or more of the heat exchangers otherwise described herein. The POX reactor can comprise any commercially available system. Non-limiting examples of commercially available systems useful according to the present disclosure include a Shell dry powdered coal feed entrained flow reactor, a GE/Texaco quench reactor, a Siemens cooling screen quench reactor, or similar systems. Useful POX reactors can include internal heat transfer sections absorbing radiant heat from the POX burner. In further examples, the internal heat transfer sections can be configured for conductive and/or convective heating. In such embodiments, a portion of the high pressure recycled $CO_2$ stream from the power production system can be heated and returned at a higher temperature to the PPS system. A recycle stream taken from the PPS system for heating as described above may be taken at any pressure, such as a pressure of about 10 bar to about 400 bar, and the recycle stream thus may be at any temperature prior to the above-discussed heating, such as a temperature of about 50° C. or greater (e.g., about 50° C. to about 500° C. or about 100° C. to about 400° C.). For example, recycled $CO_2$ at a temperature of about 400° C. can be heated to a temperature of about 450° C. to about 600° C. within the POX reactor and returned to the recuperative heat exchanger in the power production system where it can be remixed with a further portion of the high pressure recycle $CO_2$ stream at a similar temperature. In some embodiments, heat can be transferred to a high pressure water stream to generate saturated or superheated steam.

Combination of a POX reactor with a power production system according to the present disclosure can provide a variety of useful aspects. As an example, the combination can be defined in that impurities (such as from coal or other solid fuel and from partial oxidation of the fuel) can be retained in the cooled, high pressure POX stream that enters the power production system combustor. Such impurities can comprise $H_2S$, COS, $CS_2$, HCN, $NH_3$, Hg. These and other impurities can be oxidized in the power production system combustor so as to form, for example, $SO_2$, $CO_2$, $N_2$, NO, and Hg, which then can be removed from the power production system. For instance, a water stream condensed from the power production system combustor exit stream can be acidic comprising one or more of $HNO_3$, $H_2SO_4$, and dissolved inorganic salts, such as described in U.S. Pat. No. 8,596,075 to Allam et al. In one or more embodiments, at least a portion of the impurities can be recycled back to the POX system. For example, the water leaving a water scrubber laden with $NH_3$ and HCN may be used as makeup water for a coal-water slurry system whereby the $NH_3$ and HCN serve the function of providing additional heating value in the POX reactor. As a further example, $NH_3$ may be used as part of a sulfur removal system whereby ammonia is combusted to generate NOX.

The processing of the solid fuel through the POX reactor rather than directly through a power production system combustor can be particularly useful in light of the ability to remove possibly fouling reaction products. For example, a POX stream exiting the POX reactor can be quenched to a temperature of about 400° C. or less or a further temperature useful to ensure that ash derived from coal (or other molten impurities arising from coal or other solid fuel) is in a solid form which can be removed. Preferably, solid impurities can be removed down to a very low concentration and sufficiently low particle size so as to substantially prevent blockage and/or corrosion of components of the power production system, such as heat exchangers, turbines, compressors, and the like.

In addition to the foregoing, the quenching of the POX stream from the POX reactor can be adapted to provide a quenched POX stream below a temperature as defined herein and is sufficiently low to ensure that the vapor phase concentration of any inorganic components in the solid fuel is likewise sufficiently low to substantially prevent deposition in one or more components of the power production system. For example, partial oxidation of coal can produce one or more alkali metal salts including NaCl, $CaSO_4$, and KCl, which can be removed as discussed herein. As such, while it is possible for impurities to be passed through the POX stream and combusted in the PPS combustor, it can be preferable to carry out one or more purification and/or conversion steps otherwise described herein to provide a fuel gas for the PPS combustor that is substantially pure—i.e., comprises a majority by mol %, comprises at least 75 mol %, comprises at least 90 mol %, comprises at least 95 mol %, or comprises at least 99 mol % fuel gas (e.g., excluding water, non-combustible solids, metals, and acid gases).

The systems and methods of the present disclosure can be adapted to provide for recovery of substantially all of the heat released during cooling of the POX stream, preferably cooling to near ambient temperature, and recovery of the heat into the recycled high pressure $CO_2$ stream in the power production system. This additional heating particularly can be provided at the lower temperature level in the recuperator heat exchanger of the power production system. Input of additional heat in this manner can provide a significant positive effect on the overall efficiency of the power production system. This effect is due to the much higher specific heat of the high pressure recycle $CO_2$ stream in the lower temperature range of 50° C. to 400° C. compared to the higher temperature range of 400° C. to 800° C. and to the lower specific heat of the turbine exhaust stream that is cooling in the recuperator heat exchanger of the power production system. This marked difference means that significant additional extra heat is required in the recuperator heat exchanger over the temperature range 50° C. to 400° C. to heat the recycle $CO_2$ stream. The additional heat obtained from the quenched POX stream in the POX stream heat exchanger provides an effective quantity of additional heat for the power production system combustor that is substantially equivalent to the quantity of heat released when fuel gas itself is combusted.

In various embodiments wherein the POX reactor is quenched to saturation using a recycle water stream, the temperature-heat release curve for the quenched POX stream cooling to near ambient temperature shows a large initial heat release as the water vapor derived from vaporization of the quench water begins to condense. This heat release per unit temperature drop reduces progressively as the POX stream cools. The effect requires two separate high pressure recycle $CO_2$ streams taken from the power production system high pressure recycle stream to be used to recover heat from the cooling quenched POX stream. In some embodiments, the first high pressure recycle $CO_2$ stream can be taken from the $CO_2$ recycle compressor discharge at the temperature of about 45° C. to about 70° C. The second high pressure recycle $CO_2$ stream can be taken from the high pressure recycle stream at a point in the recuperator heat exchanger where there is a small temperature approach to the dew-point of the turbine exhaust cooling stream. These two streams together can provide for a large initial heat release from the cooling quenched POX stream as its water content begins to condense that can be efficiently transferred back to the high pressure $CO_2$ recycle stream at the highest possible temperature level. In some embodiments, the POX stream can be partially quenched to a first temperature, such as down to a temperature of about 900° C., about 700° C., about 500° C., or about 400° C. When partial quenching is employed, a cooling range between the partial quench temperature and the water dew point of the quenched POX stream exists, and this range can require a lower flow of recycle high pressure $CO_2$ to efficiently remove this portion of the heat available from the quenched POX stream as compared to the temperature range below the water dew point of the POX stream. This can be accomplished by removing a portion of the heating high pressure recycle $CO_2$ stream at a point near and/or below the water dew-point temperature of the quenched POX stream while the remaining portion is removed at a temperature near to and/or below the quench temperature. The heated high pressure recycle $CO_2$ streams then can be returned to the recuperator heat exchanger at a corresponding temperature point to the bulk flow of high pressure recycle $CO_2$ in the recuperator heat exchanger. In various embodiments, options for the two streams to combine in the POX cooling heat exchanger with a single return stream can be provided. In some embodiments, more than two streams of high pressure recycle fluid can be used.

In some embodiments, the fuel gas taken from the POX reactor following quench and ash removal can comprise predominantly $H_2$, CO, $CO_2$ and $H_2O$ at a temperature of about 250° C. to about 400° C. A portion of this fuel gas stream can be taken for the production of pure $H_2$, CO, or a combination thereof with varying $H_2$ to CO ratios. Typical applications for large scale $H_2$ production can be, for example, hydro-desulfurization and hydrocracking in refineries and, potentially, as a vehicle fuel. Typical applications for $H_2$ and CO mixtures can be, for example, Fischer-Tropsch hydrocarbon liquids production (e.g., with about a 2.2 $H_2$ to CO ratio) and methanol production (e.g., with about a 2.0 $H_2$ to CO ratio). In each case, the $H_2$ to CO ratio must be increased from the ratio of approximately 1 or less in the POX stream (of in a stream of fuel gas from the POX stream) where the ratio depends on use of $CO_2$ or water as the slurrying medium for the solid fuel. Water based slurry with more water in the POX product gas results in a significant proportion of the CO being converted to $H_2$ and $CO_2$, giving a $H_2$ to CO ratio of just below 1. $CO_2$ based slurry has a much lower $H_2$ to CO ratio. It can be useful to pass at least part of the fuel gas separated from the quenched POX stream through a catalytic shift reactor to convert CO to $H_2$ by reaction with steam, as shown below in Formula (2).

$$CO+H_2O=H_2+CO_2 \qquad (2)$$

This can be accomplished using a portion of the fuel gas taken at a temperature of about 250° C. to about 400° C. following ash removal and by using a sulfur tolerant CO shift catalyst, such as one based on cobalt in the shift reactor. The portion of fuel gas that has been enriched in $H_2$ can be then cooled in a separate pass through the POX heat exchanger. Heat released in the exothermic shift reaction can be transferred into the PPS as previously described. The exit shifted gas then can be mixed with a portion of the remaining cooled POX stream and the combined stream can be passed through a multi-bed pressure swing adsorber designed to separate the $H_2$ and CO at the required $H_2$ to CO ratio as a single non adsorbed component while the adsorbed components can contain all of the sulfur compounds, HCN, $NH_3$, Hg, $CO_2$, $H_2O$ and most of the $CH_4$. This un-adsorbed fraction may also contain some $N_2$ and Ar derived from the coal (or other solid or liquid fuel) and oxygen used in the POX reactor. These inert components preferably will be below 5% total concentration which is acceptable for the gas feed to both the Fischer-Tropsch and Methanol reactors. If pure $H_2$ production is required, only the shifted cooled gas will be fed to the PSA. The near atmospheric pressure waste gas from the PSA with all of the coal and POX derived impurities in a reduced form will be compressed and returned to the remaining fuel gas from the POX stream for combustion in the PPS combustor.

In some embodiments, at least a portion of a water quenched POX stream can be passed through a reverse WGS reactor. For example, a water quenched POX stream comprising fuel gas at a temperature of about 900° C. or greater can be processed in a reverse WGS reactor to convert a mixture of $H_2$ and $CO_2$ into a shift reactor exit gas comprising a mixture of CO and $H_2O$.

The POX stream (or fuel gas from a POX stream), in some embodiments, can be processed through an acid gas removal unit, for example, to separate at least a portion of any $H_2S$ and/or $CO_2$ present therein. In particular, acid gas removal can be carried out after cooling of the POX stream in the POX heat exchanger and after removal of water from the POX stream. Acid gas removal preferably is carried out before compression of the fuel gas to the pressure for introduction to the PPS combustor. The acid gas removal process can be separated into three general types: chemical reagents, physical solvents, and hybrid solvents. Non-limiting examples of the acid gas removal process are Rectisol, Sulfinol, MDEA, Selexol, aqueous di-isoproponal (ADIP) amine, and FLEXSORB. One method can involve the use of a two stages Selexol process (UOP LLC, USA), wherein $H_2S$ is removed at the first stage, and $CO_2$ is removed at the second stage. $H_2S$ from acid gas removal can be converted into liquid elemental sulfur by any method known to those skilled in the art, including the Claus process, or can be converted into a commercial quality sulfuric acid by any method known to those skilled in the art, including the wet sulfuric acid process. $CO_2$ removed from the POX stream through acid gas removal can be compressed and merged into the compressed recycle $CO_2$ stream for passing to the PPS combustor. In some embodiments, the POX fuel stream can be passed through an activated adsorption system to remove mercury therefrom.

In one or more embodiments, the POX stream (or fuel gas from the POX stream) can be processed through a methanation system. In particular, methanation can be carried out after cooling of the POX stream in the POX heat exchanger and after removal of water from the POX stream. Methanation preferably is carried out before compression of the fuel gas to the pressure for introduction to the PPS combustor. The fuel gas produced in the catalytic POX reactor can, in some embodiments, have as $H_2$ to CO ratio of approximately 3:1 after passing through a water gas shift reactor. $H_2S$ and $CO_2$ can be removed at the acid gas removal process, and the POX fuel gas with high methane content exiting the acid gas removal process can predominately contain CO, $H_2$ and $CH_4$. The fuel gas exiting the methanation system can have a methane content of about 50% by volume or greater, about 75% by volume or greater, about 85% by volume or greater, about 90% by volume or greater, or about 95% by volume or greater. The heat released in the methanation process can be recuperated in one or several heat exchangers. The cooling stream in these heat exchangers can include a high pressure recycle fluid stream withdrawn from and returned to the PPS, a high pressure water stream, a nitrogen stream withdrawn from an ASU for the solid fuel drying process, a high pressure $O_2/CO_2$ stream, and/or a cleaned cooled fuel gas stream. Exemplary methanation processes include the use of the high temperature TREMP™ Process by Haldor Topsoe. See, for example, U.S. Pat. No. 8,530,529, the disclosure of which is incorporated herein by reference.

One embodiment of a power production system with partial oxidation of a solid fuel is described in reference to FIG. 1, wherein a solid fuel is provided in the form of coal feed stream 21 to be partially oxidized in the POX reactor 4. The coal stream 21 is crushed and partially dried in large particle crusher 1 that is also fed dry nitrogen stream 23 comprising $N_2$ at a temperature of about 82° C. (180° F.) taken from an air separation unit 6, which produces oxygen streams 32 and 60 and nitrogen stream 23 from air intake stream 62. Preferably, the dry nitrogen stream 23 can be heated against a higher temperature stream of $CO_2$ rich turbine exhaust leaving the recuperator heat exchanger in the PPS. Excess nitrogen stream 22 exits large particle crusher 1. The partially crushed coal in stream 24 is further crushed to a particle size preferably of about 250 microns or less in the small particle crusher 2 to provide particularized coal stream 25, which is directed to a slurry mixer 3. In the slurry mixer 3, the particularized coal is mixed with $CO_2$ slurry medium stream 29, which preferably has a pressure of about 8.5 MPa or greater. The $CO_2$ in the $CO_2$ slurry medium stream 29 in this embodiment is at a temperature of about 17° C. The $CO_2$ in the $CO_2$ slurry medium stream 29 has a density of about 865 kg/m³. The powdered coal is increased in pressure in a lock hopper system or by other means to a pressure of 8.5 MPa prior to mixing with the $CO_2$. A coal/$CO_2$ slurry stream 26 exits the slurry mixer 3 and preferably comprises about 45% by weight coal. Alternatively the slurry medium can be a water stream. The powdered coal injection system can also be configured as a dry feed system in which the powdered pressurized coal is entrained in a nitrogen stream and fed into the POX burner. The slurry stream 26 is then pumped into the POX reactor 4 where it is combined with oxygen stream 56, which preferably comprises 95% molar or greater oxygen concentration. The POX reactor 4 preferably operates at a pressure of about 8.5 MPa and a temperature of about 1400° C.; however, the temperature and pressure can be in any combinations of temperature and pressure ranges as otherwise disclosed herein in relation to the nature of the POX stream exiting the POX reactor. The conditions for the preparation of the coal slurry can be adjusted accordingly.

The POX reactor 4 is adapted to partially oxidize the coal and form a POX stream, which may exit the POX reactor and enter a quench chamber (not illustrated) or may be quenched within the POX reactor itself, as illustrated in FIG. 1. The POX stream can comprise a fuel gas that can comprise one or more combustible (i.e., oxidizable) materials, including but not limited to $H_2$, CO, $CH_4$, $H_2S$, COS, $CS_2$, HCN, $NH_3$. Moreover, the POX stream can comprise Hg and other impurities derived from the coal (or other solid fuel) as well as inert materials (e.g., $N_2$ and Ar), such as derived from the oxygen stream 56, plus other trace components. The POX stream also can comprise one or more non-combustible materials, such as char, ash or slag, which can be filtered from the POX stream as desired.

The POX stream (either internal to the POX reactor or in a separate component) is quenched by mixing with a quench fluid (liquid water stream 57 in the present embodiment). As illustrated, the liquid water stream 57 enters the POX reactor near the base in a restriction nozzle. The addition of the quench stream cools the POX stream components preferably to below the water saturation temperature of about 304° C. (although higher temperatures also are encompassed). The quench temperature preferably also can be a temperature at which non-combustibles, such as ash and slag, are in solid form. The excess quench water collects with the slag and the bulk of the fine ash in the sump of the POX reactor vessel (or separate quench vessel) where it is removed for further treatment. The quenched POX stream 58 passes to scrubber unit 5, which comprises a water scrub tower followed by a fine cartridge filter adapted to reduce the dust load to about 4 mg/m³ or less of fuel gas, about 3 mg/m³ or less of fuel gas, or about 2 mg/m³ or less of fuel gas. Scrubber unit 5 also can include all equipment and pumps required to recycle the scrub water and also to treat the ash stream 66 for disposal. An exemplary embodiment of a system useful for POX reactor ash treatment and gas cleaning is a GE/Texaco POX system with a coal/water slurry burner, which alternatively can be modified to accept a coal/$CO_2$ slurry. Solids thus can be removed from the POX stream comprising the fuel gas through one or more solids removal components.

As illustrated in FIG. 3, additional cooling units may be utilized as desired. In particular, as shown in FIG. 3, the POX stream 58a leaving the POX reactor 4 may pass through a cooler 101 (e.g., a radiant cooler or a convective cooler) and exit as cooled POX stream 58b prior to entering the scrubber unit 5. In one or more embodiments, further processing units may be utilized for treatment of the POX stream 55 passing between the scrubber unit 5 and the POX heat exchanger 7. As illustrated in FIG. 4, POX stream 55a exiting the scrubber unit 5 may pass through one or more of a shift reactor 102, a COS hydrolysis reactor 103, and a warm desulfurization unit 104 before passing to the POX heat exchanger 7 (with intermediate streams 55b, 55c, and 55d). It is understood that said elements are optional, and only one or two of the noted elements may be utilized. Moreover, the shift reactor 102, COS hydrolysis reactor 103, and warm desulfurization unit 104 may be provided in any order when two or more of the elements are present.

The cleaned fuel gas plus steam stream 55 is cooled in POX heat exchanger 7. The exit stream 59 is further cooled against cooling water in heat exchanger 9. Liquid water 46 is separated in separation vessel 8 from the inlet stream 61 and pumped in pump 11 back to the POX reactor quench and some addition makeup water from stream 38 to produce quench water stream 57. In some embodiments, the resultant stream is net fuel gas stream 47, which can then be compressed in a multi-stage centrifugal compressor 10 to a pressure suitable for input as stream 48 to the power production system combustor 14. As an example, the fuel gas stream 47 can be compressed to a pressure of about 30.5 MPa.

In one or more embodiments, the stream exiting the separation vessel 8 can be an intermediate fuel gas stream 47a, which include further materials for removal and/or can be subject to further treatment for upgrading. For example, as shown in FIG. 5, the intermediate fuel gas stream 47a can be passed through one or more of an acid gas removal unit 105, an activated adsorption system 106, and a catalytic methanation system 107 before being passed to compressor 10 (with intermediate streams 47b, 47c, and 47d). It is understood that said elements are optional, and only one or two of the noted elements may be utilized. Moreover, the acid gas removal unit 105, the activated adsorption system 106, and the catalytic methanation system 107 may be provided in any order when two or more of the elements are present.

In certain embodiments, it can be preferred for the acid gas removal unit 105 to be present. As such, acid gases, such as hydrogen sulfide, hydrogen halides, carbon dioxide, sulfur oxides, and nitrogen oxides, can be removed prior to compression of the fuel gas. It some embodiments, it can likewise be preferred for the activated adsorption unit 106 to be present.

The compressed fuel gas stream 48 is heated in the recuperator heat exchanger 12 to a temperature suitable for input to the power production system combustor 14. As an example, the compressed fuel gas stream 48 can be heated to a temperature of about 746° C. The heated fuel gas stream 64 is burned in the power production system combustor 14 where it is combined with oxygen and $CO_2$. In the illustrated embodiment, combined $O_2/CO_2$ stream 51 comprises 25% $O_2$ and 75% $CO_2$ on a molar basis. The combined $O_2/CO_2$ stream 51 preferably been heated to a temperature suitable for input to the power production system combustor 14. As an example, the combined $O_2/CO_2$ stream 51 can be heated to a temperature of about 746° C. in the recuperator heat exchanger 12. A hot recycle $CO_2$ stream 52 is directed from the recuperator heat exchanger 12 and is at a temperature suitable for input to the power production system combustor 14. As an example, the hot recycle $CO_2$ stream 52 can be heated to a temperature of about 746° C.

In the power production system combustor, the combustion gases from burning of the fuel gas are cooled with the hot recycle $CO_2$ stream 52 producing a combined combustion product stream 50 at a temperature of about 1150° C. and a pressure of about 30 MPa in the illustrated embodiment. This is expanded to a pressure of about 3 MPa in turbine 13 coupled to an electric generator 65 producing an output power 63. The turbine outlet stream 49 is cooled in the recuperator heat exchanger 12 leaving as cooled product stream 53 at a temperature of about 64° C. in the illustrated embodiment. The stream 53 is cooled to a temperature of about 17° C. in water cooler 16. The further cooled turbine outlet stream 54 enters a scrub tower 17, which has an outlet stream 40 that is largely recycled via circulation pump 18 to scrub tower liquid inlet 41 above the packed section of the tower that receives the further cooled turbine outlet stream 54. A portion of stream 40 is split out as stream 39 for further treatment. As the turbine exhaust gas cools below the water dew-point in the recuperator heat exchanger 12 the following reactions occur.

$$NO + \tfrac{1}{2}O_2 = NO \quad (3)$$

$$NO_2 + SO_2 = SO_3 + NO \quad (4)$$

$$SO_3 + H_2O = H_2SO_4 \quad (5)$$

The above reactions will proceed in the presence of liquid water, nitrogen oxides, $SO_2/SO_3$, and excess oxygen. The $SO_2/SO_3$ concentrations are reduced to very low levels since the limiting reaction shown in Formula (3) rapidly proceeds at 3 MPa, and the reactions of Formula (4) and Formula (5) are very fast. When all of the sulfur oxides have been converted to sulfuric acid, the nitrogen oxides are converted at about 95% conversion rate per pass to nitric acid with the following reaction sequence.

$$2NO_2 + H_2O = HNO_2 + HNO_3 \quad (6)$$

$$3HNO_2 = HNO_3 + 2NO + H_2O \quad (7)$$

$$NO + \tfrac{1}{2}O_2 = NO_2 \quad (8)$$

Returning to FIG. 1, the nitric acid present in net liquid acid product stream 39 will convert any mercury present to mercuric-chloride. The scrub tower 17 preferably is fitted with an additional water wash and acid mist removal section. Its primary function is to act as an efficient dilute acid removal device since virtually all the above reactions will have taken place upstream of the scrub tower 17. The mixed acids are treated with limestone slurry stream 36 (or other suitable base) in mixer 15 to produce gypsum and calcium nitrate stream 37. Any other trace metallic salts can also be separated. The residual water stream 38 following calcium nitrate and dissolved salts removal can be used as make-up to a cooling tower or the POX quench system or as scrub water recycled to scrub tower 17.

The predominantly $CO_2$ stream 42 leaving the scrub tower 17 at a pressure of about 2.9 MPa is compressed in a multi-stage intercooled compressor/dense fluid multistage pump 19 to a pressure suitable for input to the power production system combustor, such as about 30.5 MPa. The compressed $CO_2$ discharge stream 35 leaves the last stage of the pump 19 at a temperature of about 54° C., and part of this flow, stream 70, is heated in the recuperator heat exchanger 12 to a temperature of about 746° C., leaving as $CO_2$ stream 52.

The air separation plant 6 in this embodiment produces a 99.5% molar oxygen purity product stream at a pressure of about 8.6 MPa which divides into two separate streams. Oxygen stream 60 is heated in heat exchanger 7 to a temperature of about 294° C., exiting as stream 56 for use in the POX reactor 4 for partial oxidation of the coal. The remaining oxygen stream 32 is mixed with $CO_2$ at a pressure of about 8.6 MPa. Specifically, $CO_2$ is taken from an intermediate stage of the compressor 19 as stream 30, and a portion stream 31 mixes with oxygen stream 32 giving a composition of about 25% $O_2$ and 75% $CO_2$ molar. This diluted $O_2$ stream 33 is compressed to a pressure of about 30.5 MPa in a multi-stage intercooled compressor 20 and the discharge stream 34 is heated in the recuperator heat exchanger 12 to a temperature of about 746° C. and enters the power production system combustor 14 as stream 51. Dilution of the pure $O_2$ stream 32 is beneficial to allow the oxygen required for combustion in the power production system combustor 14 to be heated to a high temperature without the need for oxidation resistant materials. This ensures the safe operation of the power production system. The 30% $O_2$ stream is useful to moderate the adiabatic combustion temperature in power production system 14 to a value of approximately 2400° C. The remaining portion of $CO_2$ stream 30 is $CO_2$ stream 29, which provides the $CO_2$ for slurrying the powdered coal and is directed to slurry mixer 3.

Cooling of the quenched POX gas in heat exchanger 7 is useful to transfer the maximum quantity of heat to the power production system to maximize the overall efficiency. The power production system requires a significant quantity of heat from an external source in the temperature range from near ambient up to about 400° C. This can be provided by using adiabatic air compressors in the air separation plant 6 and transferring the heat of compression to part of the high pressure recycle $CO_2$ stream. In the present embodiment, the required external heating load is provided by cooling the quenched POX gas in POX heat exchanger 7 and heating two high pressure recycle streams. High pressure recycle $CO_2$ stream 28 at a temperature of about 54° C. and high pressure recycle $CO_2$ stream 43 at a temperature of about 120° C. taken from an intermediate temperature point in recuperator heat exchanger 12 are heated to provide a combined heating outlet stream 44 at a temperature of about 294° C., which is returned to mix with the main recycle $CO_2$ stream at a corresponding temperature point in recuperator heat exchanger 12. Optionally, outlet stream 67 also may be returned to the recuperator heat exchanger at a corresponding temperature point to mix with the main recycle $CO_2$ stream as well.

In one or more embodiments, it can be useful to provide for heat transfer between the POX heat exchanger 7 and the PPS recuperator heat exchanger 12 via a dedicated heat transfer loop. For example, as illustrated in FIG. 6, a heat transfer fluid stream 109 circulates between the POX heat exchanger 7 and the PPS recuperator heat exchanger 12 via pump 108. The heat transfer fluid stream 109 can be at a pressure above ambient pressure, such as a pressure up to about 30 MPa, up to about 20 MPa, or up to about 10 MPa. In particular embodiments, the heat transfer fluid stream 109 can transfer heat from the POX heat exchanger 7 to the PPS recuperator heat exchanger 12.

In exemplary embodiments, heat exchanger 7 can be a high pressure brazed or diffusion bonded multi-channel unit. The material of construction preferably is corrosion resistant in the presence of the impurities present in the POX gas plus liquid water. Recuperator heat exchanger 12 preferably is a diffusion bonded multi-channel unit. This unit preferably is adapted for operation at temperatures up to about 800° C. and to be resistant to acid corrosion at temperatures below about 200° C. An exemplary suitable material is Specialty Metals alloy 740. In some embodiments, the average temperature at the hot end of heat exchanger 12 can be reduced to below 750° C. and, in such cases, alloy 617 can be suitable. Optionally the intermediate section between 200° C. and 540° C. can be fabricated from stainless steel. The section which is subject to potential acid corrosion below 200° C. can be constructed to allow replacement at intervals.

In further embodiments, alternate arrangements of the elements for processing the POX stream can be used. In an exemplary embodiment, FIG. 2 shows an optional arrangement wherein the POX product is used both for production of fuel gas for the power production system and for production of a separated and purified mixture of $H_2$ and CO. A side-stream 90 is taken from the quenched POX gas stream 55 following ash removal and passed through a catalytic shift converter 91 having a sulfur resistant cobalt based shift catalyst (or other suitable material). The higher temperature exit gas stream 92 is cooled in heat exchanger 7 to a temperature of about 60° C., exits as stream 73, and is further cooled by cooling water in heat exchanger 74 to a temperature of about 20° C. as stream 75. Condensed water 78 is separated in separator 77, and the cooled gas stream 76 enters a multi-bed pressure swing adsorption unit 79. The water 78 separated in separator 77 is added to liquid water stream 46. The pressure swing adsorption unit (PSA) 79 is designed to separate the inlet gas stream 76 into a pure $H_2$ or a pure $H_2$ and CO stream 80 leaving the unit at a pressure of about 8 MPa and a waste gas stream 93 which contains all of the impurities (e.g., $H_2S$, COS, $CS_2$, HCN, $NH_3$, Hg, and other trace components) as well as some combination of $H_2$, CO, $CO_2$, $CH_4$, and $H_2O$. The separation of the impurities is such that the concentration of these components in the $H_2$ or $H_2$ and CO product stream 80 is below 1 ppm. This arrangement uses a stream 83 of cooled POX gas containing a high concentration of CO to blend with the shifted cooled gas stream 76 to produce a stream 72 which when passed through the PSA unit 79 and gives the required flow and the required $H_2$ to CO ratio in the 8 MPa product stream 80. If pure $H_2$ is required then stream 83 is zero. The waste gas stream 93 from the PSA 79 at 0.12 MPa pressure is compressed in a multi-stage intercooled compressor 81 to a pressure of about 8 MPa, and the discharge stream 82 is added to the fuel gas stream 47 to be compressed and passed to the power production system combustor 14 (see FIG. 1). The total fuel gas stream is compressed to a pressure of about 30.5 MPa in compressor 10, and the resultant high pressure fuel gas stream 48 is sent to the power production system combustor 14 via recuperator heat exchanger 12 (referencing FIG. 1). This arrangement ensures the transfer of all coal and POX derived impurities to the power production system where they are oxidized in the power production system combustor 14. In various embodiments, the consumption of additional water in the shift reaction can proceed according to Formula (9) and may require a small additional make-up flow.

$$H_2O+CO=CO_2+H_2 \qquad (9)$$

As seen from the foregoing, the present disclosure particularly can provide processes for the production of power using a combination of a partial oxidation (POX) system and a power production system (PPS). The processes can be defined through implementation through any combination of process steps described herein.

The present disclosure further can provide a power production unit that comprises a partial oxidation (POX) system and a power production system (PPS). Said unit can include any of the following components: a POX reactor; a POX scrubber or other filtration unit); a POX heat exchanger; a POX water separator; a POX acid gas removal system; a POX compressor; a PPS combustor; a PPS turbine, a PPS recuperator heat exchanger; a PPS separator; a PPS compressor; a solid fuel feeding system; a shift reactor; a carbonyl sulfide (COS) hydrolysis reactor; a desulfurization unit; an activated adsorption unit; a catalytic methanation system; and a close heat transfer loop between the POX heat exchanger and the PPS heat exchanger. In addition to the foregoing, the power production unit can comprise flow lines interconnecting any of the noted components to provide for flow of fluids between said components, and the power production unit can comprise valves, connectors, and controllers as needed to facilitate flow of fluids between the respective components. Moreover, it is understood that the foregoing components will include inlets and outlets for flow of fluids therein and flow of fluids therefrom during operation of the power production unit as described herein. Likewise, to the extent that various components (or inlets and/or outlets thereof) are described as being in fluid communication, it is understood that said fluid communication can include the presence of flow lines interposed between said components (or inlets/outlets thereof) as well as the presence of one or more further components interposed between said components. Further, it is understood that in a power production unit comprising a plurality of components processing flowing fluids, certain components may be considered to be upstream from other respective components and/or downstream from other respective components. Positioning of a component upstream and/or downstream from another respective component is evident, at a minimum, from the appended drawings. As such, to the extent that a first component receives a fluid flow from a second component in the appended drawings, it is understood that the first component is upstream from the second component, and the second component is downstream from the first component. Likewise, a third component downstream from the second component would likewise be considered to be downstream from the first component, and such relationships are evident from the appended drawings and the further description herein.

In various embodiments incorporating elements of the systems and methods described herein, the overall efficiency of the disclosed systems and methods is greater than 50% (on a lower heating value (LHV) basis with representative turbine and compressor efficiencies and heat exchanger temperature differences and pressure drops). Moreover, CCS is simultaneously provided along with substantially complete removal of all other fuel, POX, and combustion derived impurities. Excess $CO_2$ derived from the carbon in the fuel stream 21 is removed from the circulating $CO_2$ system as stream 71 at 30.5 MPa (see FIG. 1). This can be facilitated in that the systems and methods can be adapted to provide substantially all of the fuel derived $CO_2$ at a pressure of about 15 MPa or greater, about 20 MPa or greater, about 25 MPa or greater, or about 30 MPa or greater. This high efficiency beneficially can be achieved with a low cost system, such as using commercially available POX reactor systems and a high pressure $CO_2$ working fluid power cycle, such as described in U.S. Pat. No. 8,596,075 to Allam et al. As a comparative example, existing commercial coal based integrated gasification combined cycle (IGCC) power generation systems with $CO_2$ capture and compression to pipeline pressure have been shown to have efficiencies on a comparable basis of only 34% to 39% and have much higher capital cost.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A process for the production of power using a combination of a partial oxidation (POX) system and a power production system (PPS), the process comprising:
    combining a solid or liquid fuel and oxygen in a POX reactor under conditions sufficient to partially oxidize the fuel and form a POX stream comprising a fuel gas at a first temperature;

removing from the POX stream comprising the fuel gas at least a portion of any solid components or gaseous components that do not form part of the fuel gas in a scrubber unit;

processing at least a portion of the POX stream comprising the fuel gas from the scrubber unit in a carbonyl sulfide (COS) hydrolysis reactor adapted to convert COS to $H_2S$;

cooling the POX stream comprising the fuel gas from the COS hydrolysis reactor in a POX heat exchanger to a second, lower temperature to form a cooled POX stream comprising the fuel gas;

purifying the cooled POX stream comprising the fuel gas from the POX heat exchanger by removing liquid water and acid gases therefrom and thus forming a stream of the fuel gas;

compressing the stream of the fuel gas to a pressure of about 12 MPa or greater to form a compressed stream of the fuel gas;

combusting the compressed stream of the fuel gas in a PPS combustor to form a combustion product stream at a pressure of at least about 10 MPa and a temperature of at least about 800° C.;

expanding the combustion product stream across a PPS turbine to generate power and form an expanded PPS combustion product stream;

passing the expanded PPS combustion product stream through a PPS recuperator heat exchanger and thereby withdrawing heat from the PPS combustion product stream and forming a cooled PPS combustion product stream;

removing at least a portion of one or more impurities from the cooled PPS combustion product stream to form a recycle $CO_2$ stream; and pressurizing the recycle $CO_2$ stream in a PPS compressor to form a compressed recycle $CO_2$ stream.

2. The process of claim 1, wherein the POX reactor is a gasifier.

3. The process of claim 1, wherein the POX reactor is a fluidized bed reactor.

4. The process of claim 1, wherein the POX reactor is a catalyzed reactor.

5. The process of claim 1, further comprising reducing the temperature of the POX stream comprising the fuel gas to a temperature that is less than the first temperature and greater than the second temperature prior to cooling the POX stream comprising the fuel gas in the POX heat exchanger.

6. The process of claim 5, wherein reducing the temperature of the POX stream comprising the fuel gas comprises adding a quenching fluid to the POX reactor.

7. The process of claim 6, wherein the quenching fluid comprises one or both of water and $CO_2$.

8. The process of claim 1, further comprising heating the compressed stream of the fuel gas after said compressing and before said combusting.

9. The process of claim 8, wherein heating the compressed stream of the fuel gas comprises passing the stream of the fuel gas through the PPS recuperator heat exchanger.

10. The process of claim 1, further comprising providing one or both of steam and $CO_2$ into the POX reactor.

11. The process of claim 1, wherein the POX heat exchanger is configured to withdraw heat from the POX stream comprising the fuel gas against one or more of the following: a portion of the compressed recycle $CO_2$ stream; a stream of pressurized water; a nitrogen stream; a stream of pressurized $O_2$ and $CO_2$; a stream of the fuel gas.

12. The process of claim 1, further comprising passing a portion of the POX stream comprising the fuel gas through a shift reactor configured to convert a mixture of $H_2$ and $CO_2$ to a mixture of CO and $H_2O$ or configured to convert a mixture of CO and $H_2O$ to a mixture of $H_2$ and $CO_2$.

13. The process of claim 12, further comprising mixing a portion of the POX stream comprising the fuel gas with a portion of the recycle $CO_2$ stream to form a mixture, and processing the mixture in the shift reactor.

14. The process of claim 13, wherein the shift reactor is a reverse water gas shift (WGS) reactor.

15. The process of claim 1, further comprising passing a portion of the POX stream comprising the fuel gas through a warm desulfurization unit configured to remove one or more of $H_2S$, COS, and heavy metals from the POX stream comprising the fuel gas stream.

16. The process of claim 1, further comprising passing at least a portion of the POX stream comprising the fuel gas through an activated adsorption system configured to remove mercury from the POX stream comprising the fuel gas.

17. The process of claim 1, further comprising passing at least a portion of the stream of the fuel gas through an acid gas removal unit configured to separate one or both of at least a portion of any $H_2S$ and at least a portion of any $CO_2$ present in the stream of the fuel gas.

18. The process of claim 1, further comprising passing at least a portion of the stream of the fuel gas through a catalytic methanation system configured to convert CO and $H_2$ to $CH_4$ and $H_2O$.

19. The process of claim 1, wherein at least a portion of the compressed recycle $CO_2$ stream is heated in the PPS recuperator heat exchanger and passed to the PPS combustor.

20. The process of claim 1, wherein a portion of the compressed recycle $CO_2$ stream is passed to the POX heat exchanger.

21. The process of claim 20, wherein the compressed recycle $CO_2$ stream exits the POX heat exchanger and is passed to the PPS recuperator heat exchanger.

22. The process of claim 1, wherein a portion of the compressed recycle $CO_2$ stream is passed to the POX reactor.

23. The process of claim 1, wherein a portion of the compressed recycle $CO_2$ stream is combined with the solid or liquid fuel prior to combining the solid or liquid fuel with the oxygen in the POX reactor.

24. The process of claim 1, wherein the solid or liquid fuel comprises a fuel slurry formed of a solid fuel combined with a liquid or supercritical $CO_2$.

25. The process of claim 1, further comprising circulating a heat transfer fluid stream between the POX heat exchanger and the PPS recuperator heat exchanger via a pump.

* * * * *

UNITED STATES PATENT AND TRADEMARK OFFICE
CERTIFICATE OF CORRECTION

PATENT NO. : 10,989,113 B2
APPLICATION NO. : 15/703042
DATED : April 27, 2021
INVENTOR(S) : Brock Alan Forrest et al.

It is certified that error appears in the above-identified patent and that said Letters Patent is hereby corrected as shown below:

On the Title Page

On the page 2, in item (56), in Column 2, under "U.S. Patent Documents", Line 70, delete "Lijima" and insert -- Iijima --.

On the page 3, in Column 2, under "Other Publications", Line 1, delete "Doestal" and insert -- Dostal --.

On the page 3, in Column 2, under "Other Publications", Lines 1-2, delete "Dioxide Cycle Dioxide Cycle" and insert -- Dioxide Cycle --.

On the page 3, in Column 2, under "Other Publications", Line 11, delete "Conyers." and insert -- Convers. --.

On the page 3, in Column 2, under "Other Publications", Line 18, delete "fo" and insert -- of --.

Signed and Sealed this
Seventh Day of March, 2023

Katherine Kelly Vidal
*Director of the United States Patent and Trademark Office*